United States Patent
Leach

(10) Patent No.: US 6,599,576 B1
(45) Date of Patent: Jul. 29, 2003

(54) DECORATIVE PANELS COATED WITH TWO THERMOSETTING MATERIAL LAYERS AND ITS METHOD OF MANUFACTURE

(75) Inventor: Roger John Leach, Leatherhead (GB)

(73) Assignee: Thorstone Business Management Limited, Colby (GB)

( * ) Notice: Subject to any disclaimer, the term of this patent is extended or adjusted under 35 U.S.C. 154(b) by 0 days.

(21) Appl. No.: 09/807,056

(22) PCT Filed: Oct. 8, 1999

(86) PCT No.: PCT/GB99/03335

§ 371 (c)(1),
(2), (4) Date: Apr. 6, 2001

(87) PCT Pub. No.: WO00/20348

PCT Pub. Date: Apr. 13, 2000

(30) Foreign Application Priority Data

Oct. 8, 1998 (GB) ............................................. 9821983

(51) Int. Cl.[7] ................................................. B05D 3/02
(52) U.S. Cl. ................. 427/375; 427/385.5; 427/389.7
(58) Field of Search ......................... 428/195; 427/375, 427/389.7, 385.5

(56) References Cited

U.S. PATENT DOCUMENTS 5,019,440 A    5/1991  Ogasawara et al.
5,300,174 A  * 4/1994  Leach et al. ................. 156/283
5,714,199 A  * 2/1998  Gerhardinger et al. ....... 427/195

FOREIGN PATENT DOCUMENTS

| EP | 0 517 114 | 12/1992 |
| GB | 2207089 | 1/1989 |
| GB | 2 257 929 | 6/1991 |
| GB | 2252079 | 7/1992 |
| WO | 91/02648 | 3/1991 |

* cited by examiner

Primary Examiner—Cathy Lam
(74) Attorney, Agent, or Firm—Davis & Bujold, P.L.L.C.

(57) ABSTRACT

A panel having a glass substrate (1), carries a transparent polyester powder-coating (2) with images (5) printed on its back surface (4) for viewing through the glass. A colored polyester powder-coating (6) covers printed surface (4) and is backed by metal foil (7). Manufacture involves heating polyester powder deposited on a silane-treated surface (3) of the glass (1), to form the coating (2) about 70% cured. Images (5) are printed on surface (4) using a color-separation process with ink having u.v.—and thermo-curing properties, the ink being u.v. cured after each printing step of the process. Heat applied to cure polyester powder of coating (6), also thermo-cures the ink (5) and completes curing of coating (2). The foil (7) is brought into contact with the melted powder of coating (6) to bond it to the coating (6).

11 Claims, 1 Drawing Sheet

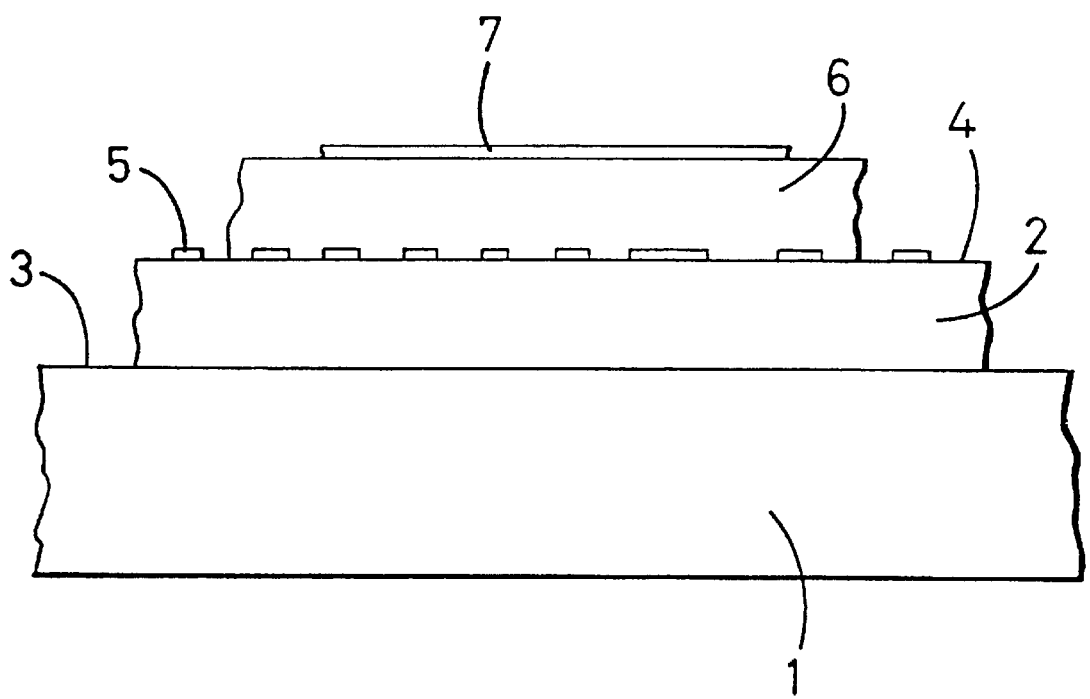

DECORATIVE PANELS COATED WITH TWO THERMOSETTING MATERIAL LAYERS AND ITS METHOD OF MANUFACTURE

This invention relates to panels and is concerned especially with panels of a decorative or other form incorporating one or more viewable images.

BACKGROUND OF THE INVENTION

It is known from GB-A-2207089 and GB-A-2252079 to provide architectural and other panels that present a coloured background viewable through a glass or other transparent or translucent surface. The present invention has as one of its objects the extension of this to enable one or more images to be similarly presented.

SUMMARY OF THE INVENTION

According to one aspect of the present invention there is provided a panel having a transparent or translucent facing that carries on its back surface a transparent fused coating of thermosetting material, wherein one or more printed images are borne by the back surface of the transparent coating and the one or more images on this surface are covered by a further fused coating of thermosetting material.

The transparent and further coatings may both be of fused polyester or other powder-coating material, and the further coating may contain pigmentation.

According to another aspect of the invention there is provided a method of manufacturing a panel, wherein a thermosetting powder-coating material which is deposited on the back surface of a transparent or translucent facing of the panel, is heated to form a partly-cured transparent coating on said back surface, one or more images are printed on the back surface of the partly-cured transparent coating, further thermosetting powder material is deposited to cover the one or more printed images, and heat is applied both to complete curing of the transparent coating and fuse the further powder material into a coating bonded to the transparent coating.

The partly-cured transparent coating may be a transparent coating of thermosetting powder material cured to substantially 70% of its fully-cured condition.

The further thermosetting powder material may be a thermosetting powder-coating material and the heat applied to fuse the further powder material may cure this powder concurrently with completing cure of the transparent coating.

The one or more images may be printed in an ink having both ultra-violet and thermo-curing properties. In this case, ultra-violet light may be applied to harden the one or more printed images prior to the deposition of the further thermosetting powder material thereon. More especially, a colour-separation printing process may be used with ultra-violet light applied following each step of the process to harden the ink applied during that step.

BRIEF DESCRIPTION OF THE DRAWING

A panel and a method of manufacture thereof, both in accordance with the present invention will now be described, by way of example, with reference to the accompanying drawing which shows the panel in sectional side elevation.

DETAILED DESCRIPTION OF THE PREFERRED EMBODIMENT(S)

Referring to the drawing, the panel is faced by a sheet 1 of clear glass which carries a polyester coating 2 that is bonded to a back surface 3 of the glass using a silane adhesion promoter. The back surface 4 of the coating 2 is printed with one or more images in ink 5 and the whole of the printed surface 4 is covered by a further polyester coating 6 of white or other colour. The coating 6, which provides the background against which the one or more printed images on the surface 4 can be viewed through the glass, is backed by an aluminium (or other metal) foil 7.

In the manufacture of the panel shown in the drawing, the surface 3 of the glass sheet 1 is cleaned and coated with a film (not shown) of the silane adhesion promoter. Polyester powder-coating material is then deposited on the silane-prepared surface 3 and subjected to heat to melt it and bring it to a substantially hard, but not to the fully cross-linked final form of the coating 2, leaving it about 70% cured. One or more images in the ink 5 are now printed on the back surface 4 of the coating 2 in its partly-cured state, using a silk-screen, bubble-jet or laser printing technique.

The printing may be half-tone or line print, and where colour is involved is applied as a colour-separated print image. The ink used is a hybrid to the extent that it has ultra-violet and thermo curing properties. The ultra-violet curing property is used between successive steps in the colour-separation process to harden the ink after each ink application to the extent that the print is touchable without smudging and will not run, but is still soft; desirably the ink contains a reactive agent that gives it a high cure-rate to ultra-violet light. The print is applied in the reverse order from convention, since the image is to be viewed through the glass sheet 1 and clear coating 2.

Following application of the print image(s), polyester powder-coating material containing appropriate pigments to give the white or other colour for the background to the printed image(s), is deposited on the printed surface 4. Heat is now applied to cure the powder into the hardened coating 6 and concurrently complete the cure of the coating 2 and of the ink 5. The thermo-cure agent of the ink ensures that the print fuses into the coatings 2 and 6 as they harden fully into one. While during the heating, the powder of the coating 6 is in the melt form, the aluminium foil 7 is brought into contact with the melt to be bonded firmly to the coating 6 in the fully hardened and finished panel.

The coatings 2 and 6 of polyester are found to be subject to moisture ingress if they exceed 80 microns in thickness. Where they are 80 microns or less in thickness their dissimilar characteristics, even though they are of the same basic material, acts as a moisture barrier resisting ingress of moisture through capillary action.

The aluminium foil 7 acts as a moisture barrier, but even if it is omitted, the molecular nature of the polyester inks are sufficiently different to provide an effective interference barrier between the two polyester powder coatings 2 and 6, enhancing the water-resisting characteristics.

What is claimed is:

1. A method of manufacturing a panel having a light-transmitting facing element with the facing element having a back surface, the method comprises the steps of:

depositing powder of a thermosetting polyester powder-coating material on the back surface of the facing element;

heating the deposited powder to form a partly-cured transparent coating on the back surface of the facing element with the deposited powder-coating material being only partially cured to about 70% such that the deposited powder-coating material is sufficiently hardened without fully cross-linking;

printing at least one image on the partly-cured transparent coating;

depositing further thermosetting powder material to cover the printed image on the partly-cured transparent coating; and applying heat to fuse the further thermosetting powder material into a coating bonded to the partly-cured transparent coating and completely cure of the partly-cured transparent coating.

2. The method according to claim 1, further comprising the step of using one of a half-tone printing process and a line printing process for the printing step.

3. The method according to claim 1, further comprising the step of forming the transparent coating to have a cured thickness of 80 microns.

4. The method according to claim 1, further comprising the step of forming the coating of the further thermosetting powder material to be of no greater than 80 microns in thickness.

5. The method according to claim 1, further comprising the step of using the same polyester powder for both the further thermosetting powder material and the thermosetting polyester powder-coating material on the back surface of the facing element.

6. The method according to claim 1, further comprising the step of the using a thermosetting polyester powder-coating material as the further thermosetting powder material, and the applying heat step fuses the further thermosetting powder material while concurrently completely curing the party-cured transparent coating.

7. The method according to claim 1, further comprising the step of adding pigmentation to the further thermosetting powder material.

8. The method according to claim 1, wherein the step of printing the at least one image further comprises the steps of printing the image with an ink having both ultraviolet and thermo-curing properties, and applying ultraviolet light to harden the printed image prior to depositing of the further thermosetting powder material thereon.

9. The method according to claim 8, wherein the step of printing the at least one image with the ink having both ultraviolet and thermo-curing properties further comprises successive steps of color-separation printing with the ink, and applying ultraviolet light following each successive step of the color-separation printing to harden the ink applied after each successive printing step.

10. The method according to claim 1, further comprising the step of bringing a metal foil into contact with a back surface of the further thermosetting powder material, while the further thermosetting powder material is in a partially melted state, and bonding the metal foil thereto.

11. The method according to claim 1, further comprising the step of using glass as the facing element.

\* \* \* \* \*